United States Patent Office 3,435,085
Patented Mar. 25, 1969

3,435,085
AROMATIC HYDROGENATION USING A FLUORIDED ALUMINA CATALYST
Robert J. White, Pinole, and Robert J. Houston, San Rafael, Calif., assignors to Chevron Research Company, San Francisco, Calif., a corporation of Delaware
No Drawing. Filed Sept. 25, 1967, Ser. No. 670,384
Int. Cl. C07c 5/10, 5/14
U.S. Cl. 260—667                                           7 Claims

ABSTRACT OF THE DISCLOSURE

Aromatics are hydrogenated in the presence of sulfur over a catalyst containing a Group VIII hydrogenation metal disposed on an essentially nonsiliceous support comprising alumina and 10–35 percent fluorine. Platinum is the preferred Group VIII metal. The catalyst retains a high degree of activity in the presence of up to 3 percent sulfur in the feed.

BACKGROUND OF THE INVENTION

This invention relates to processes for the catalytic hydrogenation of aromatic hydrocarbons; and, in particular, it relates to processes for the hydrogenation of aromatic hydrocarbons in the presence of sulfur by use of a nonsiliceous catalyst containing greater than 10 percent fluorine.

General processes for the hydrogenation of aromatic hydrocarbons are well known and are utilized for many purposes. Numerous catalysts have been used to promote hydrogenation. Among the catalysts described in the prior art are what are often referred to as "fluoride catalysts." In general, these catalysts are composed of any one of several types of supports, most of which contain silica, a hydrogenation metal such as a Group VI or Group VIII metal, and a small amount of fluorine, usually referred to as a "promoter." The fluorine promoter is present to the extent of up to a few percent by weight of the catalyst. In many cases, the fluorine promoter is disclosed to be optional and used only where the support itself is not sufficiently acidic.

It is commonly reported in the prior art that hydrogenation catalysts are extremely susceptible to sulfur poisoning. Consequently, substantial effort and expense must be incurred to remove sulfur from the aromatic hydrocarbon feed which is to be hydrogenated. Much effort, fruitless until now, has been expended to develop a catalyst which would retain its hydrogenation activity in the presence of sulfur.

SUMMARY OF THE INVENTION

The present invention is based upon the discovery that, for the purpose of substantially hydrogenating aromatic hydrocarbons in the presence of sulfur, catalysts containing large amounts of fluorine are outstanding in their properties and are not the equivalent of the large group of superficially similar catalysts disclosed in the prior art. Specifically, it has now been discovered that, by employing the catalysts hereinafter described in a hydrogenation process in which sulfur is present, unexpectedly high degrees of hydrogenation conversion can be obtained. It has also been discovered that these hydrogenation catalysts retain an unexpectedly high degree of their activity in the presence of sulfur.

The process of this invention is a process for hydrogenating aromatic hydrocarbons, which comprises contacting said hydrocarbons with hydrogen in the presence of sulfur and an essentially nonsiliceous catalyst comprising a Group VIII hydrogenation metal disposed on a support comprising alumina and at least 10 percent fluorine.

In a more preferred embodiment, the Group VIII metal is a noble metal; and, in a still more preferred embodiment, the noble metal is platinum.

DETAILED DESCRIPTION OF THE INVENTION

The process of this invention involves hydrogenating aromatic compounds by contacting them with hydrogen in the presence of sulfur and a high fluorine content, essentially nonsiliceous Group VIII metal-containing catalyst. This catalyst has been found to be both unexpectedly sulfur resistant and also highly active. Its activity is considerably higher than that of other known "fluorided alumina" catalysts. Such "other" catalysts generally have very low fluorine contents and, in fact, the prior art generally teaches that it is undesirable to raise fluorine contents of these catalysts above a few weight percent and that 10 weight percent fluorine is an absolute maximum. Typical of these "other" catalysts are the naphtha reforming catalysts.

It has now been discovered, however, that for substantial aromatic hydrogenation in the presence of sulfur high fluoride level, which is defined to be above 10 weight percent fluorine measured as the element, is not only desirable but, in fact, is necessary. Table I illustrate the surprising order of magnitude increase in hydrogenation activity obtained by use of high fluorine content catalysts of the type described herein when compared to similar catalysts containing low fluorine contents. The experiments illustrated in Table I were made by passing benzene, containing sulfur as dimethyl disulfide, over the alumina-supported catalysts in the presence of hydrogen at 725° F., 1,200 p.s.i.a., LHSV of 3, and a hydrogen-to-hydrocarbon ratio in the feed of 10.

TABLE I

| Catalysts | A | | B | | C | | D | | E | |
|---|---|---|---|---|---|---|---|---|---|---|
| Hydrogenation metal | Pt | | Pt | | Pt | | Ni | | Ni | |
| Metal content, wt. percent | 0.37 | | 0.37 | | 0.37 | | 15 | | 15 | |
| Fluorine content, wt. percent | 0.50 | | 17 | | 17 | | 0 | | 14.5 | |
| Hydrogenation activity (HA), defined as mole percent of benzene converted at 725° F. at various sulfur contents (SC) measured as p.p.m. of sulfur or wt. percent sulfur | HA | SC, wt. percent S | HA | SC, wt. percent S | HA | SC, wt. percent S | HA | SC, p.p.m. S | HA | SC, p.p.m. S |
| Hours on stream: | | | | | | | | | | |
| 0–1 | | | | | | | | | | |
| 2 | 9 | 1 | 78 | 1 | | | | | | |
| 5 | 7 | 1 | 79 | 1 | 88 | 1 | | | | |
| 6–7 | 8 | 1 | 77 | 1 | 84 | 1 | | | | |
| 23 | 7 | 1 | 77 | 1 | 81 | 1 | 1.5 | 500 | 19 | 500 |
| 26–27 | | | | | | | 2.5 | 20 | 38 | 20 |
| | | | | | | | 2.5 | 20 | 41 | 20 |

It is apparent from the data of Table I that the high fluorine content catalysts increase hydrogenation of aromatic compounds by an order of magnitude even though a large amount of sulfur is present in the feed. This result is completely unanticipated and unexpected from the teaching of the prior art.

The catalyst employed in this invention comprises a Group VIII hydrogenation metal disposed on a support comprising alumina and greater than 10 weight percent fluorine. The Group VIII hydrogenation metal may be any of the three iron group or six noble metals. As illustrated in Table I, the noble metals are preferred; and particularly preferred among the noble metals is platinum. The hydrogenation metal may be present in an amount up to 25 weight percent of the catalyst. When using the noble metals, it is preferred to have a low metal content, such as 0.1–3 weight percent. The support for the catalyst must be essentially nonsiliceous, for at the high fluorine contents used in this catalyst substantial fluorine-silica reactions often occur, causing formation of volatile fluosilicate compounds and subsequent collapse of the catalyst and plugging of the catalyst bed. Preferably no silica at all should be present. However, a very small amount, no more than about 1 or 2 weight percent of the catalyst, can be tolerated in some instances when the total fluorine content is to be at or only slightly above 10 weight percent.

The fluorine content must be above 10 weight percent, and is preferably in the range of 12–35 weight percent. Fluorine may be added to the catalyst either before or after the metal is added. The fluorine may be incorporated into the catalyst by contacting the alumina support with a gaseous or liquid fluorine compound. A particularly preferred method of fluoriding the catalyst is to pass a gaseous mixture of hydrogen and hydrogen fluoride over an alumina support to which the desired amount of metal has previously been added. This generally causes a stoichiometric conversion of alumina to aluminum fluoride and may be continued until the desired amount of fluorine has been incorporated into the catalyst. Another satisfactory method of incorporating fluorine into the catalyst is to contact the alumina support, to which metal has previously been added, with a solution of ammonium fluoride. Catalysts fluorided by the latter procedure do not appear to be as active as those fluorided with the HF/hydrogen mixture. They are, however, considerably and unexpectedly more active than the low fluorine content catalysts disclosed in the prior art.

Aromatic hydrogenation in the presence of sulfur with the catalyst herein described is conducted at a temperature in the range of 650°–900° F., a pressure above 500 p.s.i.a., preferably in the range of 1,000–4,000 p.s.i.a., a liquid hourly space velocity (LHSV) of 0.2–10, and a ratio of hydrogen-to-hydrocarbon in the feed of 1:1–20:1.

In some instances, it may be desirable to increase the the activity of a high fluorine content catalyst by heating the catalyst in a reducing atmosphere prior to its use for hydrogenation. This heat activation is commonly conducted in the temperature range of 800°–1,300° F. Such activation should be used judiciously, however; for in some cases high temperature activation, although creating an initial high activity of the catalyst, causes the catalyst to deactivate relatively rapidly. This deactivation appears to be more pronounced when the heat activation has been conducted above 1,000° F.

The process of this invention, as contrasted to conventional hydrogenation processes with nonfluorided or low fluorine content catalysts, provides a method for obtaining significant hydrogenation of sulfur-containing, unsaturated feedstocks. Sulfur contents of up to about 3 percent based on feed can be tolerated by the high fluorine content catalysts of this process. This will significantly reduce the amount of desulfurization that must be performed on hydrogenation fuels and, in many cases, will eliminate entirely the need for separate and expensive desulfurization steps prior to hydrogenation.

It is apparent that many widely different embodiments of this invention may be made without departing from the scope and spirit thereof; and, therefore, it is not intended to be limited except as indicated in the appended claims.

We claim:
1. A process for the hydrogenation of aromatic hydrocarbons in the presence of sulfur which comprises contacting said aromatic hydrocarbons with hydrogen in the presence of sulfur and an essentially silica-free catalyst comprising a Group VIII metal on a refractory support comprising alumina and at least 10 weight percent fluorine.
2. The process of claim 1 wherein the Group VIII hydrogenation metal is a noble metal.
3. The process of claim 2 wherein the noble metal is platinum.
4. The process of claim 1 wherein the fluorine content of the catalyst is in the range of 12–35 weight percent.
5. The process of claim 1 wherein the catalyst is activated after formation by heating in a reducing atmosphere at a temperature at least as high as the temperature at which the hydrogenation is to be performed.
6. The process of claim 5 wherein the catalyst is activated at a temperature in the range of 700–950° F.
7. The process of claim 1 wherein the catalyst is formed by impregnating with the Group VIII metal and thereafter fluoriding the composite to the desired degree by contacting the composite with gaseous HF and hydrogen.

References Cited
UNITED STATES PATENTS

| | | | |
|---|---|---|---|
| 2,757,128 | 7/1956 | Hemminger | 260—667 |
| 2,728,713 | 12/1955 | Kearby | 260—667 |
| 2,884,469 | 4/1959 | McCauley | 260—667 |
| 3,054,833 | 9/1962 | Donaldson et al. | 260—667 |

DELBERT E. GANTZ, *Primary Examiner.*

V. O'KEEFE, *Assistant Examiner.*

U.S. Cl. X.R.
252—441, 442